United States Patent
Elbe

[11] 3,858,979
[45] Jan. 7, 1975

[54] METHOD OF DETERMINING THE PROPERTIES OF A JEWELERY STONE AND APPARATUS FOR THIS METHOD

[75] Inventor: Maximo Elbe, Hamburg, Germany

[73] Assignee: Colorant Schmuckstein GmbH, Norderstedt, Germany

[22] Filed: Sept. 26, 1972

[21] Appl. No.: 292,417

[30] Foreign Application Priority Data
Sept. 29, 1971 Germany.............................. 2148582

[52] U.S. Cl.................................. 356/30, 356/209
[51] Int. Cl. ............................................ G01n 21/22
[58] Field of Search................. 356/30, 31, 209–212

[56] References Cited
UNITED STATES PATENTS
1,799,604  4/1931  Read.................................... 356/30
3,610,756  10/1971  Lenzen................................ 356/30

*Primary Examiner*—Ronald L. Wibert
*Assistant Examiner*—F. L. Evans
*Attorney, Agent, or Firm*—Toren, McGeady and Stanger

[57] ABSTRACT

A technique is described for objectively determining the overall quality of a precious cut stone. A beam of parallel light rays is directed along the optical axis perpendicularly against a main exposed surface of the stone while the stone rotates about the optical axis. The principal reflected rays from the rotating stone are scanned in a spiral path by rotating a light-sensitive detector about a second axis passing through the main surface of the stone perpendicular to the optical axis. Facilities are provided for (1) displaying the logarithm of the intensity of the respective detected rays and (2) counting the number of detected reflected rays whose intensity amplitude exceeds a predetermined threshold.

21 Claims, 6 Drawing Figures

METHOD OF DETERMINING THE PROPERTIES OF A JEWELERY STONE AND APPARATUS FOR THIS METHOD

The invention relates to the objective assessment of the properties of gems or jewellery stones, particularly diamonds such as those of the finest cut, and thus to the estimation of the value of such stones or their identification.

The judgement of the effect as jewellery of fine cut diamonds by means of the unaided human eye is inadequate because the human ability to remember visual images is exceedingly bad. A passable result can be achieved only if an expert, after years of practice, estimates the value of a stone by direct comparison with a guaged, that is, a known example. Such subjective judgement, even with the qualifications mentioned, does not afford fine graduations of scale, although the value of gems really requires this. Additionally, it must be taken into consideration that one's colour vision can be influenced and a subjective judgement limited by optical fatigue and by economic influences. By 1926 apparatus was known in which the reflections of a stationary stone were examined and which in part avoided the disadvantages mentioned. However, this required a troublesome and time-consuming evaluation of the light reflections on a projection screen. The intensity of the reflections is then not measurable and fatigue of the estimator is not prevented. Apparatus of this type is therefore installed only in laboratories and cannot be of significance in wider markets.

Until now with cut diamonds (e.g. brilliants, of the finest cut) the expert has estimated the value of a stone by grading according to weight, colour, composition and cut. It is simple to determine the weight and to express it exactly in relation to a standard of a hundred carats by a number. In the meantime an apparatus has become known which measures the colour of a diamond in terms of a numerical value. All that is remaining is now the composition and the cut of the stone, which determine to a large extent its effect as jewellery. The cut influences the jewellery effect of a fine cut diamond in a double respect:

1. by the relative angles of the facets; and
2. by the quality of the surface of each facet.

The object of the invention is thus to provide a method and apparatus by means of which all essential properties of a jewelry stone can be determined.

This object is met in accordance with the invention in that reflections from a jewellery stone, produced by a constant point source of light, from a movable light sensitive receiver with a substitute pupil in dependence on continuous spiral movement through a possible viewing angle about a rotational axis of the receiving unit, are registered by a recorder and summed by a counter, whilst the stone is rotated without wobbling movement about the axis thereof.

In this way, the five properties of a diamond (weight, colour, composition, angle of cut, and quality of cut) are determined according to the invention with this method by simultaneously counting and recording the reflections of the diamond on a scale, because its light intensity increases with the size and quality of the diamond:

1. Weight: The larger the diamond, the greater is the intensity of its reflections;
2. Colour: The whiter a diamond, the more intense are its reflections;
3. Composition: The purer a diamond, the more intense are the reflections from its interior;
4. Angle of cut: The more correct the angles of cut and the surfaces are relative to one another, then the greater is the light, that is the intensity of the reflections of the diamond, and
5. Quality of cut: The cleaner the surfaces and the cuts of a diamond, the smaller the peak-to-valley heights, and the more even the surfaces, the greater is the intensity of the reflections and the purer are the spectral colours of the stone.

There then results a genuine scale, finely graduated, for the evaluation of a diamond, in that these five properties are determined at the same time, whereby they can be practically expressed in a single number.

The rotating axis of the receiver unit passes through the intersection of the actual circular plane and the rotational axis of the stone, which are perpendicular to one another.

The method provides however that differences in angles of cut are maintained for the angle of view, by the recording of the reflections in a true illustration dependent on the angle, so that this diagram gives the objective long desired "Identity pass" or precious stone passport. This describes valuable diamonds, as the print of a finger characterises a person. This plays an important part in insurance. Not least, however, this objective valuation is a true measure of the stone itself, in buying and selling. This method thus has great economic significance.

It is desirable that the valuation arrived at by objective measurement without the previously-mentioned faults should correspond to the subjective judgement of the technical expert. Consequently, the method should comprehend the properties of the diamond with the characteristics of the human eye:

1. The intensity of the reflections is logarithmically plotted;
2. The artificial pupil corresponds in diameter to the pupil of the eye in a specified amount of light;
3. The viewing distance corresponds to the normal reading distance;
4. The sensitivity curve of the eye determines the spectral response of the receiver apparatus.

The value of a diamond (or more generally a jewellery stone) depends on the number of light impressions on the observer, whereby the "fire" of a diamond is defined by its brilliance (surface shine and metallic shine from the interior) and its clearness of colour (decomposition of the white light into the spectral colours). The desired brightness of the diamond increases with the number of reflections, particularly with coloured stones, whereby each lesser intensity (from secondary reflections) which does not make an impression on the eye is suppressed. The method works logically with at least one beam from which the reflections without sufficient intensity are counted and can be recorded. A further beam can transmit particularly great intensities.

In conclusion, the method of determining the properties of jewellery stones, particularly cut diamonds, transmits these properties simultaneously, as if the expert has measured each individual factor (without fatigue). This method assists him in his ability as an expert without disadvantages, because it assesses the diamond with the eyes of the average expert.

According to the method, the diamond (FIG. 1) is rotatably arranged in a beam of parallel light, while the receiver apparatus spirally traverses the desired sector. The receiver is connected with a recording instrument, whilst at the same time the number of reflections from a certain intensity are counted off, and the light intensity units of the reflections are totalled.

The light-sensitive instrument is either a photo multiplier or a selenium photo transistor.

In a second aspect of the method, instead of these instruments, a colour film (FIG. 4) is arranged in a film holder, which produces in the form of a panorama a section over 180° of the reflection image of the stone, so that the colour reflections can be seen directly (FIG. 5).

In a third aspect of the invention (FIG. 6), the diamond is turned through 180° about its axis, so that white and coloured tracks from an image which can be photo-electrically evaluated. The greater the fire of the diamond, the greater the number of tracks will appear and so much the larger is in the amplitude of an instrument, controlled by a photocell, which acts over the film.

The invention will be readily understood from the following illustrative description and accompanying drawings. In the drawings.

Figure 1:
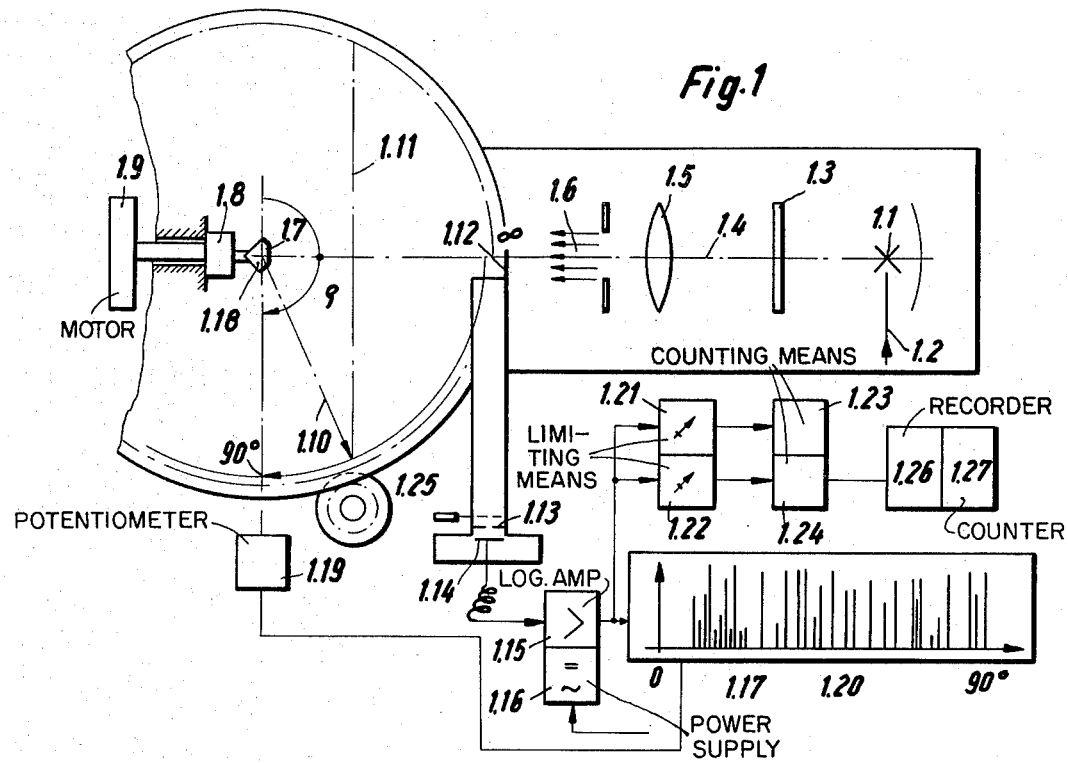
FIG. 1 shows schematically an apparatus for assessing the properties of jewellery stones according to a first aspect of the invention.

The first method of performing the invention is illustrated with reference to FIG. 1. A light source 1.1 is supplied with an adjustable constant current from a direct current supply device 1.2. Either a filter 1.3 for monochromatic light can be placed in the light beam 1.4, or the light source 1.1 produces a mono-chromatic light, being for example a thallium source (at 555nm). The light beam 1.4 engages a gem 1.7 to be examined after passage through a lens 1.5 for producing parallel light, and a diaphragm 1.6. The stone 1.7 can be turned without wobbling by a device 1.8 and a motor 1.9 with its main face arranged at right angles to the light beam 1.4. A receiver assembly is indicated by the reference numerals 1.12 to 1.14. The assembly is movable along a circular arc so that its mirror 1.12 sends a reflection 1.10 in each position along the circular arc to its receiver. The spiral examination is thus effected, in connection with the turning of the gem stone.

The image of the reflections from the main surface run directly back along the light beam 1.4, whilst the reflections from the crown facets of the diamond and also its interior are more or less uniformly distributed over the hemisphere over the actual main circular plane, as the reflection 1.10 shows by way of example.

Because the diamond 1.7 turns uniformly, each reflection describes a circle 1.11 about the optical axis of the system 1.4. These reflections impinge on the mirror 1.12 and are directed through a substitute pupil 1.13, which has a diameter of 3mm (corresponding to that of the human eye under an illumination of 1,000 Lux) to the light sensitive receiver 1.14 which transforms the light impulse electrically, for amplification in a logarithmic amplifier 1.15 with its power supply 1.16 for registration finally by a recorder 1.17. The angular position $\rho$ of the receiver assembly 1.12 to 1.14 about the rotational axis 1.18 is transferred by a potentiometer 1.19 angularly co-ordinated with the abscissa to the recorder 1.20. Thus each position of the mirror 1.12 during the measuring process, depicts the position of the reflections 1.10 to be plotted, with respect to the abscissa 1.20. The reflection signals are conveyed in parallel through adjustable limiting means 1.21 and 1.22 to counting means 1.23 and 1.24, so that at the end of the measuring process, the number of reflections from the gem of a once selected threshold or level can be read. The "peak" or "roof line" of the reflections so described gives an angularly precise representation of the jewellery effect of a fine cut diamond to the observer for all reflections capable of influencing the eye. From the superficial picture even a layman can easily asses whether a particular stone in question or another gem possesses the desired effects once he observes the uniformity of the reflections over the abscissa, secondly the information about the number of the reflections, in relation to a stone already known to him.

Additionally, he can assess from the level of the value of the light units through a recorder 1.26 a counter 1.27 how great this value is for the gem.

The filter 1.3 for mono-chromatic light gives in a second measuring process information about the colour properties of a stone. A blue filter for example permits only recording of the blue components, so that the number of coloured reflections, which appeal particularly to the human eye, is assessed.

The light sensitive receiver 1.14 can be equally well either a photomultiplier or a silicon transistor. It is only important that this receiver, together with the light source, be co-ordinated to the intensity discrimination curve of the eye, if need be by a further filter in the path of the light beam 1.4, to agree with this curve.

In the light path, a Ga As (Gallium arsenide) diode (for example for 560nm) can be pivoted in front of the screen 1.13, whereby the light source 1.1 is dimmed, in order to calibrate the whole system through the Ga As diode 1.25. With this calibration, the light source 1.1 can finally be brought to a standard value. This calibration is indispensable for an international comparison of gems.

Figure 4:
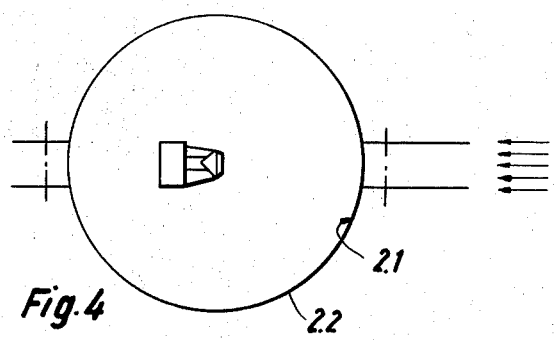
FIG. 4 is a partial schematic view of apparatus for assessing the properties of jewellery stones in accordance with a second aspect of the invention.
Figure 5:
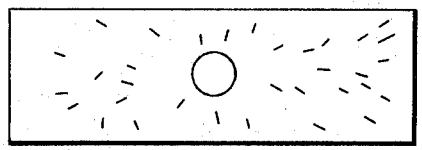
FIG. 5 represents a panoramic colour picture produced by the method of the second aspect of the invention.
Figure 6:
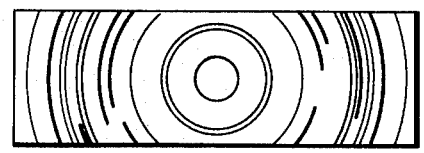
FIG. 6 shows the optical "von Laue-Debye-Scherrer" diagram according to a third method of assessing the properties of jewellery stones in accordance with the invention.

A second way of carrying the invention into effect consists in employing as shown in FIG. 4 a colour film 2.1 in a film holder 2.2 instead of the light sensitive receiver 1.14, which film directly after development shows an angularly correct section of the reflections from a stone (FIG. 5).

Finally, in a third method according to the invention, the fine cut diamond 1.7 is turned under illumination through 180° so that the reflections from the stone are shown circularly on a film. The film so produced can be assessed photo-electronically. A lively diamond will show very many circles whilst a duller stone will show fewer. The film obstructs light to a photo-cell of a measuring instrument more or less, so that the instrument output is a direct measure in terms of a number of the liveliness of the diamond.

In FIG. 1 is shown a turntable with a driving motor. The axis of rotation of the turntable coincides with the rotational axis 1.18. The turntable carries the mirror 1.12 and associated apparatus parts. Also shown is the motor of the turntable. This turntable and motor are arranged on a base on which are located also the optical bench and the mount for the shaft of the stone holding device.

Figure 2:
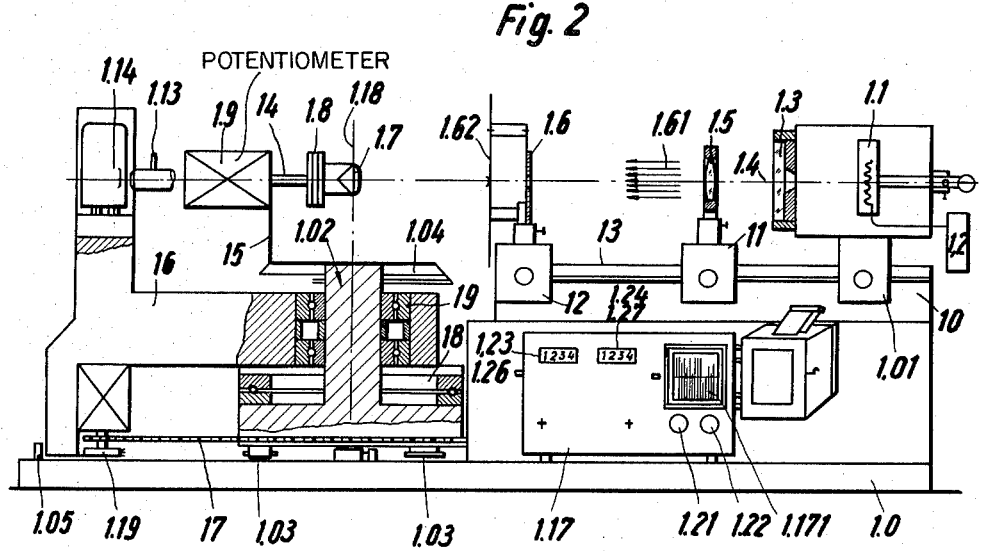
FIG. 2 is a side elevation of the apparatus shown schematically in FIG. 1, partly in section.

FIG. 2 shows additional aspects of the embodiment of the invention described first with the help of FIG. 1. In FIG. 2, parts like or corresponding to those of FIG. 1 are designated by the same reference numerals.

The apparatus is located upon a table 1.0. On this stands an optical bench 1.01 and a goniometer arrangement 1.02 which can be adjusted in height precisely to the optical axis 1.4 of the optical bench 1.01 by means of its three feet 1.03.

The gem stone 1.7 is held by the mounting arrangement 1.8. It is located with its axis in the optical axis 1.4 and major circular plane in the goniometer axis 1.18. The light source 1.1 is supplied with current from the direct current source 1.2 in the indicated way by the connecting lead shown. Also shown in FIG. 2 is the filter 1.3 for mono-chromatic light. There can be recognized the lens 1.5, which produces parallel light, and the screen or diaphragm 1.6 in connection with an apertured diaphragm 1.62, which is constituted by a large white disc, in order to display immages of the reflections from the gem 1.7. According to these reflections, the mounting of the whole optical system is adjusted.

The described structural elements are secured for longitudinal adjustment by means of supports 10, 11, 12 in a guide-way 13 of the optical bench 1.01.

The mount or holder 1.8 is connected with a drive motor 1.9 by a shaft 14. This structure is secured by means of a support 15 on a goniometer table 1.04. By this means the gem is arranged for adjustment for rotation without wobbling, with its main surface perpendicular to the light beam 1.4.

The goniometer table 1.04 is rotatably mounted on the goniometer axis 1.18 whereby the gem 1.7 can receive the light beam 1.4 at other angles of incidence. The receiver assembly elements 1.12 to 1.14 described individually above are likewise rotatable about the goniometer axis 1.18, so that the mirror 1.12 can be located in any position in the angular region $\rho$ of the gem 1.7.

Figure 3:
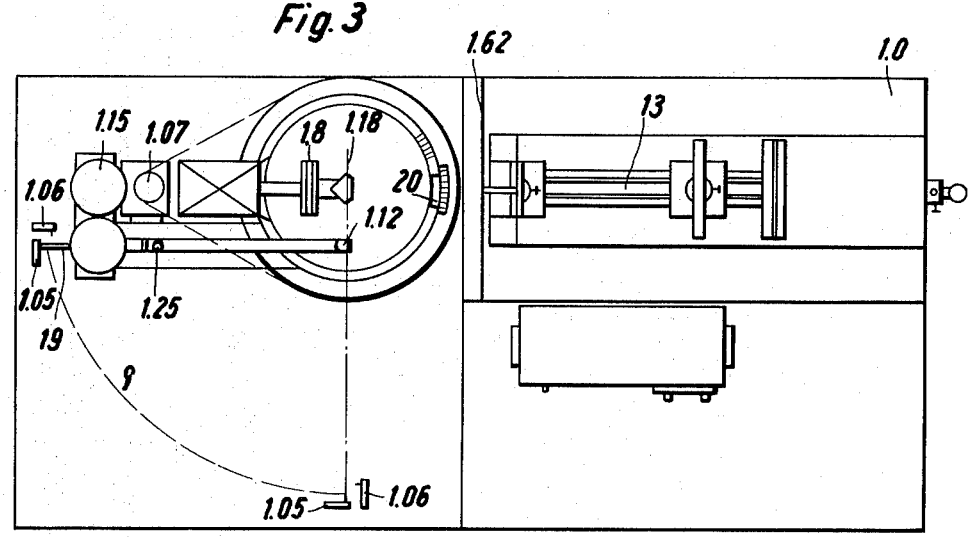
FIG. 3 is a plan view of the device of FIG. 2.

The angle of rotation, in general 90°, is determined by two limit switches 1.06 which are adjustably situated on the table 1.0 along the circular arc designated in FIG. 3 by $\rho$. The two limit switches 1.06 control the motor 1.07.

On the table 1.0 two further limit switches 1,05 are arranged within the circular arc determined by the limit switches 1.06, so as to lie in the path of movement of an actuating arm 19 for the structure 16. These second limit switches 1.05 control the functioning of the counting arrangements for the reflections. This relates to the parts designated 1.23, 1.26 and 1.24, 1.27 in FIG. 2.

Both the motors of the apparatus, 1.9 and 1.07 are synchronous motors and are co-ordinated with each other in respect of phase by electronic equipment not shown. Thereby, the reflections of and from the gem 1.7, designated in FIG. 1 by the reference numeral 1.10, are scanned spirally through the rotational movement of the receiver assembly 1.12 to 1.14 with the synchronous motor 1.07, so that all reflections over the largest circular plane of the gem stone are recorded.

In the manner described, the light reflections 1.10 are converted to electrical impulses in the light sensitive receiver 1.14 which are than amplified in a logarithmic amplifier 1.15 with its current supply source 1.16, and finally displayed as an immage 1.171 in the recorder 1.17. Because of the transfer of the angular position $\rho$ of the receiver assembly by means of the potentiometer 1.19 to the recorder, an angularly correct reference to the abscissa 1.20 of the recorder is obtained.

The motor 1.07 drives the structure 16 about the goniometer axis 1.8 by means of a chain and sprocket drive 17. The bearing means for the structure 16 are designated by 18, 19. The goniometer table 1.04 is correspondingly rotatably mounted on the middle post of the goniometer arrangement 1.02, so that its angular position is controllable by a pointer and scale arrangement 20.

I claim:

1. In a method of detecting the properties of a precious stone comprising the steps of supporting the stone in a holder with a major face thereof arranged substantially perpendicular to a first axis, directing a beam of parallel light rays along the first axis toward the major face of the stone, and detecting the intensity of selected ones of the resulting reflected rays from the stone; the improvement which comprises the further step of rotating the stone about the first axis during the detecting step.

2. A method according to claim 1, in which the detecting step comprises scanning the reflected rays along a circular arc while the stone rotates.

3. A method according to claim 1, in which the detecting step includes sensing the intensity with a spectral response corresponding to a predetermined spectral response curve of the human eye.

4. In a method of detecting the properties of a precious stone comprising the steps of supporting the stone in a holder with a major face thereof arranged substantially perpendicular to a first axis, directing a beam of parallel light rays along the first axis toward the major face of the stone, and detecting the intensity of selected ones of the resulting reflected rays from the stone, the improvement wherein the method comprises the further step of rotating the stone about the first axis during the detecting step, and wherein the detecting step comprises scanning the reflected rays along a circular arc centered about a second axis perpendicular to and intersecting the first axis of the rotating stone to define a spiral scanning pattern.

5. A method as defined in claim 4, further comprising the step of counting, during the scanning step, the number of detected reflections from the stone that exceed a predetermined value.

6. A method as defined in claim 4, in which the detecting step includes the scanning of the reflected rays along a circular arc centered about a second axis passing through the major face of the stone.

7. In a method of determining the properties of a precious stone, the steps of supporting the stone in a holder with a selected major face of the stone arranged substantially perpendicular to a first axis, directing a beam of parallel light rays along the first axis toward the major face of the stone, rotating the stone about the first axis, and exposing a photographic film with certain of the resulting reflected rays from the stone to define an optically contrasting pattern indicative of the intensity of the reflected rays.

8. A method according to claim 7 comprising the further step of photo-electrically measuring the degree of exposure of the film.

9. In an apparatus for determining the properties of a precious stone comprising first means for mounting the stone with a major face thereof perpendicular to a first axis, means for directing a beam of parallel light rays along the first axis toward the major face of the stone to cause the propagation of reflected light rays from the stone, light-sensitive receiver means operable to receive reflected light rays, and second means for mounting the receiver means for detection of light rays reflected from the stone, the improvement wherein the apparatus further comprises first means supporting the first mounting means for rotation about the first axis to correspondingly rotate the stone, and first drive means operable to rotate the rotationally supported first mounting means during operation of said receiver means.

10. Apparatus according to claim 9 further comprising second means supporting the second mounting means for movement along a predetermined path relative to the path of rotation of the first mounting means.

11. Apparatus as defined in claim 9, in which the receiver means when operative generate an output voltage corresponding to the intensity of each reflected ray detected thereby, and in which the aparatus further comprises first recording means including counting means having a count input incrementable each time a pulse applied thereto exceeds a predetermined level, and first means for coupling the output of the receiver means to the count input of the counting means.

12. Apparatus as defined in claim 9, further comprising means in the path of the rays from the beam directing means for limiting the spectrum of the directed beam to a prescribed monochromatic component.

13. Apparatus as defined in claim 9, in which the beam directing means includes a light source having a variable output intensity and means for calibrating the output intensity of the source to a standard value.

14. Apparatus as defined in claim 9, in which the receiver means includes means for deriving the logarithm of the instantaneous light ray intensity applied to the receiver means.

15. Apparatus as defined in claim 9, in which the receiver means includes an artificial pupil corresponding generally in diameter to the pupil of the human eye.

16. Apparatus as defined in claim 15, in which the first and second mounting means are so disposed that the artificial pupil of the receiver means is separated from the stone by a distance having significance relative to a typical viewing distance of the stone by a human eye.

17. Apparatus as defined in claim 11, further comprising memory means coupled to the output of the counting means.

18. Apparatus as defined in claim 11, further comprising second recording means having first and second orthogonal coordinate inputs; means for coupling the second mounting means to the first coordinate input for controlling the first coordinate input in accordance with the angle of rotation of the second mounting means from a given reference position; and second means for coupling the output of the receiver means to the second coordinate input.

19. Apparatus according to claim 9 in which said light sensitive receiver means comprises a photographic film.

20. In an apparatus for determining the properties of a precious stone comprising first mounting means for mounting the stone with a major face thereof perpendicular to a first axis, means for directing a beam of parallel light rays along the first axis toward the major face of the stone to cause the propagation of reflected light rays from the stone, light-sensitive receiver means, and second means for mounting the receiver means for detection of light rays reflected from the stone, the improvement wherein the apparatus further comprises first support means supporting the first mounting means for rotation about the first axis to correspondingly rotate the stone, first drive means operable to rotate the rotationally supported first mounting means, second means supporting the second mounting means for rotation about a second axis perpendicular to and intersecting the first axis, and second drive means operable to rotate the rotationally supported second mounting means.

21. Apparatus according to claim 20, further comprising third means including an optical bench for supporting the beam directing means for propagation of the parallel light rays along along the first axis, and a goniometer table having a third axis perpendicular to and intersecting the first axis, the first and second supporting means being positioned on the goniometer table with the first mounting means aligned with the first axis and the second axis aligned with the third axis.

* * * * *